United States Patent [19] [11] 3,766,328
Warren [45] Oct. 16, 1973

[54] SLANT TRACK ROTATING HEAD RECORDER-REPRODUCER SYSTEM FOR SELECTIVE RETENTION OF SPECIAL INFORMATION

[75] Inventor: Henry Ray Warren, Indianapolis, Ind.

[73] Assignee: RCA Corporation, New York, N.Y.

[22] Filed: Dec. 15, 1971

[21] Appl. No.: 208,255

[52] U.S. Cl. 179/100.2 T, 178/6.6 FS, 179/100.2 Z
[51] Int. Cl. ........................ G11b 15/02, G11b 23/06
[58] Field of Search............... 179/100.2 T, 100.2 Z; 178/6.6 FS, 6.6 A, DIG. 1

[56] References Cited

UNITED STATES PATENTS

| | | | |
|---|---|---|---|
| 2,943,141 | 6/1960 | Knight | 178/DIG. 1 |
| 3,051,777 | 8/1962 | Lemelson | 178/6.6 FS |
| 3,588,378 | 6/1971 | Protas | 179/100.2 Z |

*Primary Examiner*—James W. Moffitt
*Assistant Examiner*—Robert S. Tupper
*Attorney*—Edward J. Norton, James B. Hayes and Eugene M. Whitacre

[57] ABSTRACT

A system for recording and selectively playing back, repeatedly if desired, a portion of interest of continuously monitored information of given duration. Signal erasing means are scanned in precedent relation to scanned signal transducing means for cooperation with an endless loop recording medium to continuously update information stored for selective playback.

4 Claims, 11 Drawing Figures

SLANT TRACK ROTATING HEAD RECORDER-REPRODUCER SYSTEM FOR SELECTIVE RETENTION OF SPECIAL INFORMATION

This invention relates to a scanning transducer recorder-reproducer system for transducing information signals with a web like record medium which may be enclosed in a tape cartridge or cassette.

A wide variety of cartridges and systems designed to handle web-like record material exist. A well-known arrangement utilized in audio systems, includes a cartridge wherein the tape is translated longitudinally along an open boundary of the cartridge past a stationary transducing head. In such an arrangement the record medium or tape is vulnerable to contamination and/or damage during operation or when being handled and stored. Such a longitudinal recorder playback format is suitable for audio tape information where lower head to tape speeds are tolerable. However, in video systems the appreciably greater head to tape speeds required have dictated the use of alternative approaches such as the transverse type of helical scan and quadruplex recorder-reproducer systems. Generally such transverse type systems like the early audio systems are of the so called reel to reel type. The tape which is threaded through the transport path is secured at its respective ends to separately arranged supply and take up reels.

The recognized success of a cartridge or cassette approach in audio systems has motivated attempts to provide similar approaches for video tape systems. However, as noted, video systems require a rapid scanning of the record medium by one or a number of movable transducer heads. This therefore poses a formidable problem.

The carryover of the cartridge approach is particularly attractice in video systems, since contamination and damage to video record mediums due to handling, storage, etc. produces much less tolerable effects of noise and distortion on the eye of the observer of the visual end product.

Enclosing the video record medium in a cartridge or cassette solves part of the problem by minimizing contamination and damage. However, there is the requirement of manually threading or otherwise disposing the video record medium in a transport to facilitate the necessary high speed scanning of the medium by the moving transducers.

Prior art approaches to solving these problems include, a cartridge enclosing a single reel of tape where the video record medium is withdrawn from the cartridge and either manually or automatically end threaded through the transport to an empty take-up reel. Other systems utilize a coplanar two reel cartridge wherein access to the tape record medium is provided for withdrawing the tape medium to dispose it in the scanner transport path by either manual or automatic means. Further systems employ an approach, similar to audio systems, of shaping the cartridge to permit scanning of an exposed segment of the record web along a portion of the boundary of the cartridge.

Recorder-reproducer systems are generally designed to receive a given amount of information of appreciable duration for example, 30, 60 or more minutes of information, all of which is recorded and maintained on an elongated recording medium for subsequent playback. For certain applications most all of the information may be of passing interest, with the information in a period most recently precceding that immediately being processed by the recorder system being of particular interest. Such a situation may exist for example where the information processed by the recorder-reproducer system concerns a sporting event or an educational training lesson. In such a situation it may be desirable and advantageous to be able to not only quickly and simply recover this information of particular interest, but also to be able to successively repeat the particular information any number of times. With existing types of recorder-reproducer systems, it is necessary to slew the recording medium to search out and position the particular information for playback. The information is then played back once, with the necessity of repeating the whole procedure if repetition is desired. In the disclosed invention, an arrangement is described for immediately and simply recovering and repeating the segment of information of particular interest without need for resorting to the time consuming and complicated arrangements of existing systems. With the arrangement of the present invention these problems are solved in the most advantageous manner.

The disclosed arrangement also enables the video record medium to be scanned without removing it from its protective cartridge. The scanning is also provided in a novel manner, enabling the use of a small uncomplicated enclosing cartridge, which is simple and economical to fabricate. No removal of the tape medium for threading is required, thereby eliminating complex and costly hardware. The cartridge may be relatively thin and of small volume facilitating ease of handling and storage and not unnecessarily increasing the size of the recorder-reproducer system in which it operates. The transducer head scanner is arranged to extend into the cartridge and scan the video record medium. The head scanner, which includes a slotted guide surface in which the transducers are swept, is shaped for interposition between the walls of the cartridge to establish an interface with the medium within the boundaries of the cartridge. The video record medium remains within its surrounding protective cartridge, while it is scanned.

Since the breath of the transducer head scanner is made substantially comparable to the tape width, the cartridge is of regular and simplified shape. Complete enclosure and convenient access to the record medium is provided by an uncomplicated movable side wall of the cartridge.

The size compatibility of the scanner and cartridge avoids interference problems between the scanner and movable wall of the cartridge when they are interleaved for scanning, offers a more compact space savings arrangement and therefore an overall simplified system of reduced volume.

Briefly in accordance with the invention in a recorder-reproducer system, information is transduced with an elongated recording medium arranged in an endless loop form. There is provided signal transducing means, with means for mounting the signal transducing means for movement along a given path over said medium. There is also provided signal erasing means and means for mounting the erasing means for movement along said given path in proceeding relation to the signal transducing means. Means for supporting a portion of the endless loop recording medium are provided, for scanning along the path thereover by the signal transducing means and signal erasing means. And means are provided for continuously advancing, the endless loop recording medium, to repetitively dispose each successive portion of the recording medium over the supporting means in cooperative relation with the signal transducing means and the erasing means.

Figure 1:
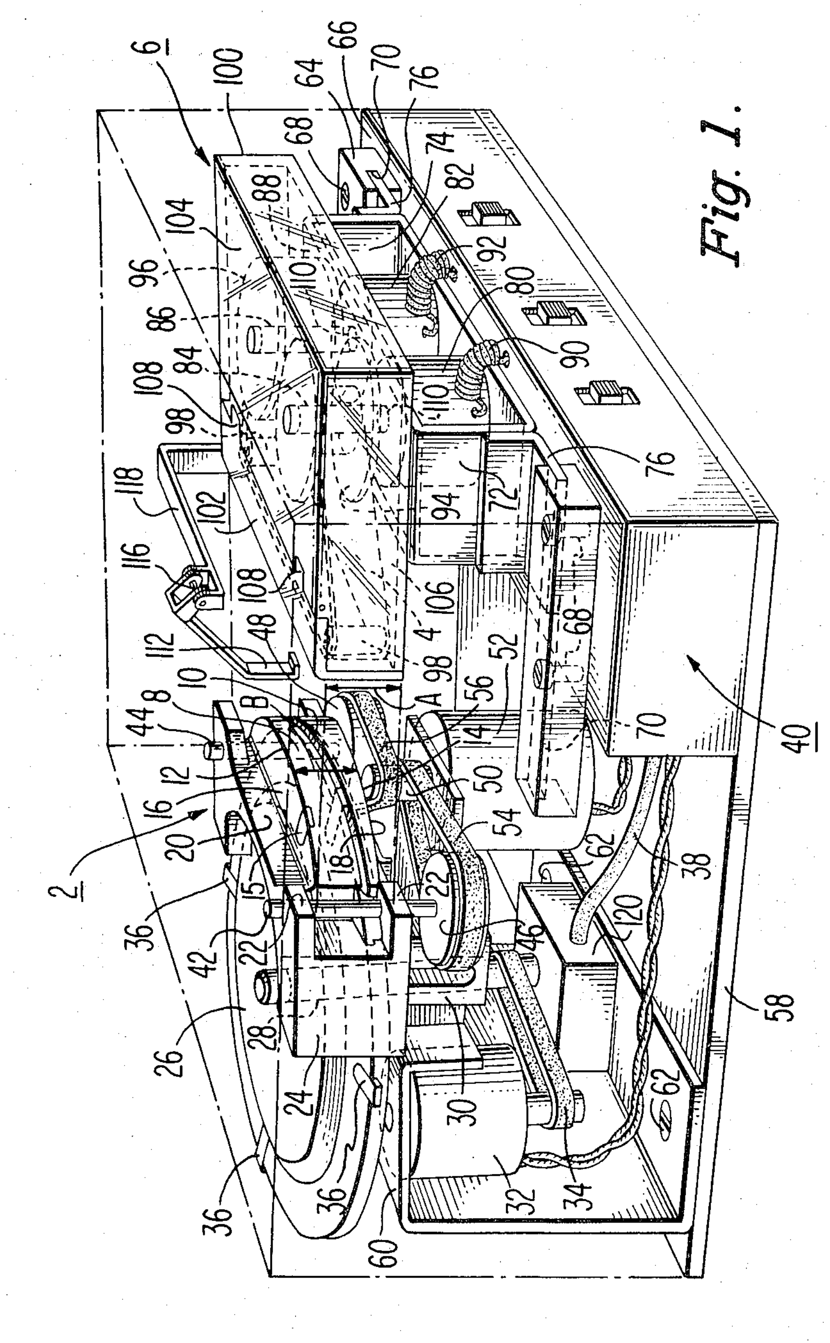
FIG. 1 is a perspective view of a recorder reproducer system wherein elements thereof are shown in a first relative position of an operating sequence.

In FIG. 1 there is shown a recorder-reproducer system including a transport-scanner assembly 2, for transducing information with a web like record medium 4, such as a tape, which is disposed within a cartridge assembly 6. The transport-scanner assembly 2 includes an arcuate guide surface 8 having a narrow slot 10 therethrough, which extends along and diagonally across the surface 8 between edges 12 and 14 thereof. A stationary transducer 15 which may be utilized for example for audio or control information, is mounted in the peripheral surface of the web guide surface 8. The surface 8 is preferably a truncated arcuate segment or sector of a cylinder with the truncated top and bottom portions 16 and 18 separated by a dimension, which is approximately equal to the width of the recording web 4. The surface 8 is supported in cantilevered manner between the recessed portions 20 of flanges 22 of a generally U shaped support member 24.

Figure 4:
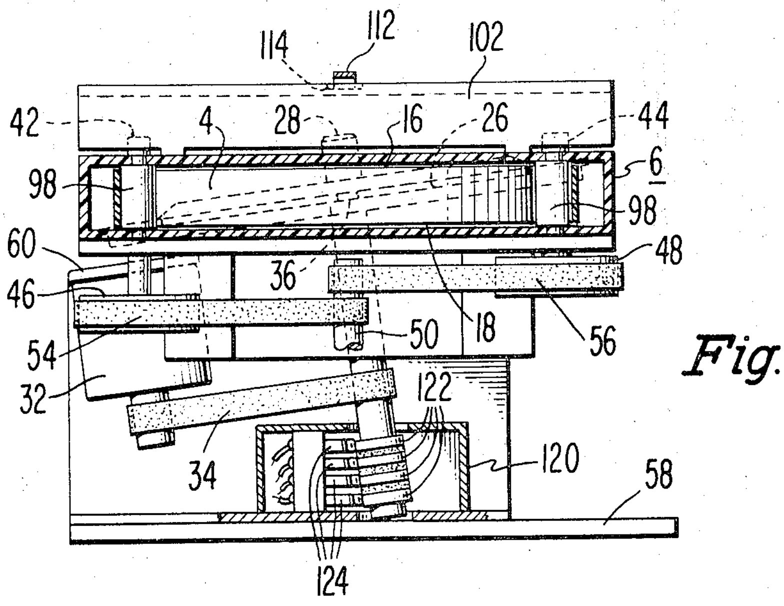
FIG. 4 is a view in section along the line 1—1 of FIG. 3.

A substantially planar disc or headwheel 26 having a shaft 28 is rotatably mounted through portion 30 of the support member 24 for rotation of the disc 26 through the slot 10. The shaft 28 of the disc or headwheel 26 is driven by motor means 32 through a belt 34. Mounted about the periphery of the disc 26 at approximately equally spaced intervals are a plurality of transducers 36. Where the recording web is a magnetic tape, the transducers 36 are one of the many known, suitable types of magnetic head transducers. The transducers 36 are arranged on the periphery of the disc 26 to protrude a small distance beyond the surface 8 in the slot 10. Signal information may be fed to and derived from the rotating transducers 36 by any one of a number of techniques well known in the art. One such arrangement, using slip rings on the rotatable shaft 28 of the headwheel 26 which cooperate with sliding contacts on a stationary member, is shown in FIG. 4. The electrical signals of the transducers 36 are intercoupled by suitable wiring with an electrical unit 40. The electrical unit 40 contains well known suitable types of circuitry for performing the functions of control, energization and signal processing for the recorder-reproducer system.

Respective ones of a pair of recording web driving members or capstan 42 and 44 are disposed at each end of the arcuate web guide surface 8. The capstans may be thought of as lying on a cord of the arc of the surface 8 where the cord intersects the arc. The capstans 42 and 44 are rotatably mounted in suitable holes provided in the flanges 22 of the generally U shaped support member 24. Drive pulleys 46 and 48 are coupled to one end of the respective capstans 42 and 44. The pulleys 46 and 48 are driven from the shaft 50 of motor means 52 by suitable belt means 54 and 56. The motor means 52 as well as the disc drive motor 32 are energized, as indicated from, the electrical unit 40. In operation of the invention, assuming the web 4 is to be advanced from the capstan 42 towards the capstan 44 over the surface 8, the velocity of the capstan 44 although in the same direction is made slightly greater than the velocity of the capstan 42. This may be accomplished for example, by providing a drive pulley 48 whose diameter is less than the diameter of the drive pulley 46. This differential velocity provides desired tension of the web 4 when transported over the surface 8. Since web tension is significant on the surface 8 for purposes of accurate tracking by the transducers 36, providing web tension in this manner allows a simplified, non-critical and less costly arrangement to be used for control of supply and take-up means for the web 4. That is, the dual capstan drive provides isolation of the web portion on the surface 8, from the perturbations experienced by the balance of the web during transport between the supply and take-up means.

It is advantageous to provide the mounting and support portions of the member 24 for the headwheel shaft 28, capstan 42 and 44, and the cantilevered arcuate guide surface 8, as unified projections or extensions of a single piece of material. This is accomplished by casting a suitable material, such as aluminum, in the form generally shown and described for the support member 24. Following casting, the slot 10, and shaft receiving holes for the capstans 42, 44 and the headwheel shaft 28 may be machined in a single machining operation. In this way the relative spacing and tolerances among the slot 10, capstans 42, 44 and headwheel shaft 28 may be established and maintained in very accurate fixed relation with one another.

The transport scanner assembly 2 is coupled to a base member 58, by means of a bracket 60 which is secured to the base by suitable means such as screws 62. Also secured to the base member 58 is the electrical unit 40. A pair of guide members 64 are secured to the top surface 66 of the electrical unit 40, by suitable means such as screws 68. As shown, the guide members 64 extend in the direction towards the transport assembly 2. Each of the guide members 64 includes a channel or slot 70, for enabling slidable motion of a member disposed therein along the guide member 64. A frame member 72 having a recess 74 is slidably mounted with respect to the base member 58, by means of brackets 76 disposed in the channel 70 of the respective guide members 64. A pair of motor means 80 and 82 are mounted by suitable means in the recess 74 of frame member 72. The shafts 84 and 86 of the motor means 80 and 82 respectively, extend through the top portion 88 of the frame member 72 for engaging and supporting a cartridge assembly 6. Motor means 80 and 82 are energized from the electrical unit 40 by means of extendable cables 90 and 92.

The cartridge assembly 6 includes a pair of substantially coplanar web or tape reels 94 and 96. The free ends of the recording web 4 are secured about the respective reels 94 and 96, with the web 4 extending about a pair of guides 98. The guides 98 may be rotatably mounted rollers of a resilient material as shown, or comprise a pair of resiliently mounted pressure pads. The web 4 with the guide 98 and reels 94 and 96 are completely enclosed, by a plurality of substantially planar fixed sides or walls 100 and a movable side or wall 102 which together form a complete enclosure thereabout. The reels 94 and 96 are rotatably mounted, by suitable means not shown, between a top side 104 and a bottom side 106 of the plurality of fixed sides 100. The movable side wall 102 is secured to top wall 104 by means such as hinges 108. A pair of apertures 110 are provided in the bottom wall 106 to permit the passage of the motor shafts 84 and 86 therethrough, for mounting the cartridge assembly 6 on the frame member 72.

Figure 2:
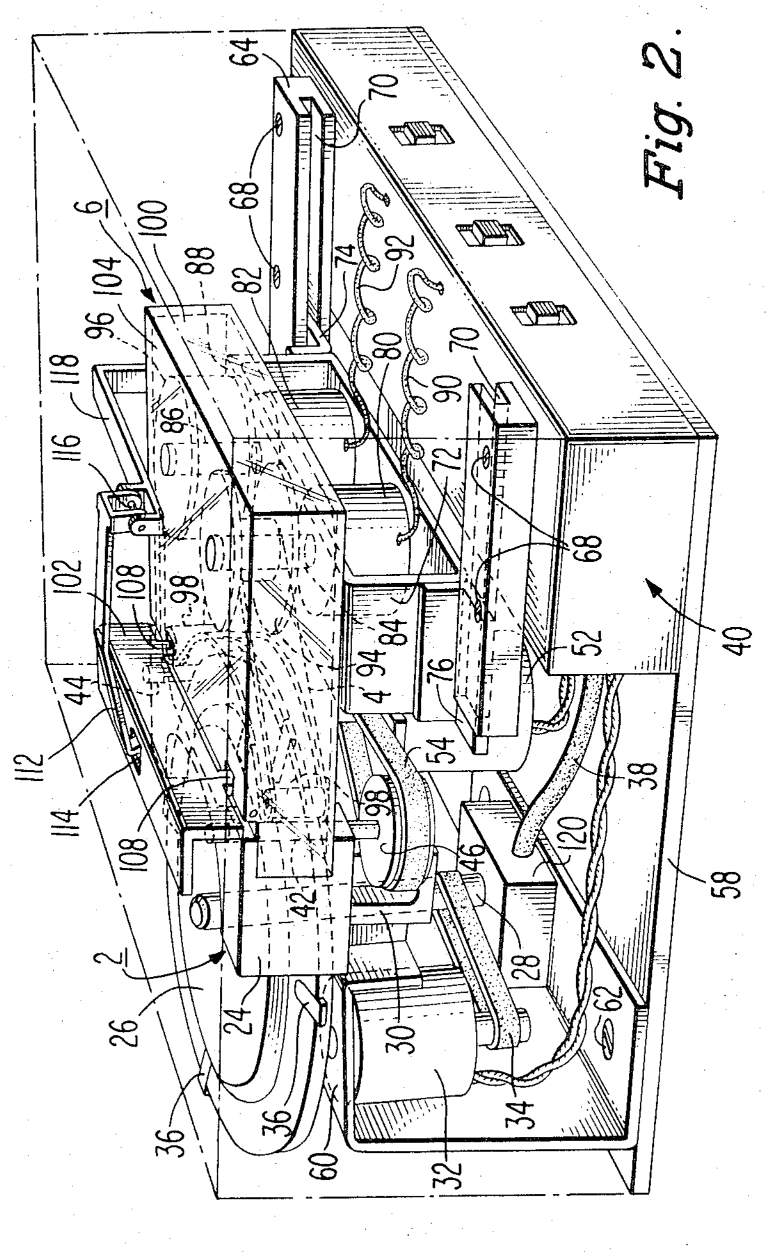
FIG. 2 is a perspective view of the system of FIG. 1, wherein the elements thereof are shown in a further position of an operating sequence.
Figure 3:
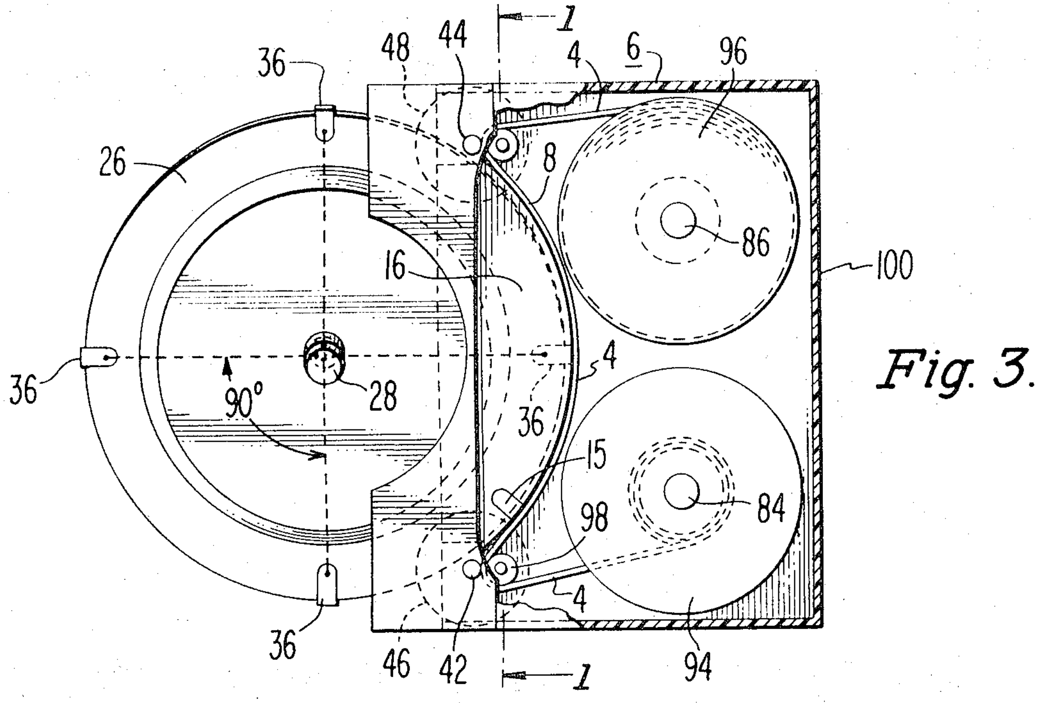
FIG. 3 is a plan view of a portion of the arrangement of FIG. 1.

As shown in FIG. 1, the height "A" or separation between fixed walls 104 and 106 is made to at least slightly exceed the dimension "B" between the edges 12 and 14 of the guide surface 8 of the transport scanner assembly 2. In FIG. 1 the system may be considered as disposed in a standby condition, with the cartridge assembly 6 disposed as shown on the slidable frame member 72. When it is desired to transduce information with the recording web 4, the frame member 72 with the cartridge assembly 6 mounted thereon is caused to move, by manual or suitable automatic means not shown, along the channels 70 of the members 64 towards the transport-scanner assembly 2. A finger like member 112 engages a groove or detent 114, which as shown in FIG. 2, is disposed in the movable wall 102 of the cartridge assembly 6. As shown in FIGS. 1 and 2, the member 112 is pivotally mounted, by means such as pin 116, to a stationary bracket 118. In FIGS. 2 through 4 like numbered elements are identical to and correspond with those shown and described with respect to FIG. 1.

As the cartridge assembly 6 continues to move towards the transport-scanner assembly 2, the movable wall 102 is caused to rotate by the member 112 toward the top wall 104 of the cartridge assembly 6. The opening or movement of the wall 102 provides access between the fixed walls 104 and 106 to the interior of the cartridge enclosure 6. Movement of the web cartridge assembly 6 continues, until the cartridge is disposed with respect to the transport-scanner assembly 2 as shown in FIG. 2. It will be understood that suitable latching means not shown, may be provided in known manner for maintaining the cartridge assembly in the position shown in FIG. 2. In the condition illustrated in FIG. 2, the truncated slotted guide surface 8 of the assembly 2 is interleaved between the walls 104 and 106, with the members 98 urging the web 4 into cooperative relation with the respective capstan 42 and 44 of the assembly 2. The interleaved relationship just described may be more clearly observed, from a consideration of the plan view and sectional view of this relationship shown in FIGS. 3 and 4.

As shown in FIGS. 3 and 4, the slotted guide surface 8 with truncating surfaces 16 and 18 extends into the hollow recess within the cartridge 6 adjacent the reels 94 and 96. This insertion of the truncated guide surface 8 within the cartridge 6, causes the recording web 4 to take the form of and be in cooperative relation with the slotted surface 8 of the transport scanner assembly 2. In this condition, the transducers 36 scan the recording web through the slot 10 when the headwheel or disc 26 is rotated. Thus it is seen that with the described arrangement, no threading of the record medium 4 in the transport path is necessary. In addition the record medium 4 need not be removed from its protective cartridge nor exposed for transducing information. Rather the record medium 4 remains and is transported within the recesses of the protective cartridge 6, with the necessary tape guiding and transducer scanning being accomplished within the cartridge.

As more clearly shown in FIG. 3, the extent of slotted arcuate guide surface 8 may be made approximately equivalent to a 90° arc segment or sector of the headwheel or disc 26, with the four rotatable transducers 36 being spaced substantially at 90° intervals about the periphery of the disc 26. This provides continuous scanning of the portion of the recording web 4 disposed on the guide surface 8. With the arrangement shown and described, the rotation of the transducers 36 through the diagonal slot 10 of the surface 8, produces a series of slant tracks extending diagonally across the recording web 4. It will be understood however that it is within the spirit of the scope of the invention to modify the arcuate extent of the guide surface 8 and provide a corresponding appropriate number of rotatable transducers 36. For example the guide surface 8 may comprise an arcuate portion of approximately 120° with three rotatable transducers located at 120° intervals about the headwheel disc 26.

Also shown more clearly in section in FIG. 4, there are means within the box 120 for feeding signals between the rotatable transducers 36 on the headwheel 26 and the stationary electronic unit 40, which is mounted on the base 58. In FIG. 4 as shown, a series of conductive slip rings 122 are provided about the shaft 28 of the headwheel 26. Each of the slip rings 122 is adapted to couple signals with the corresponding one of the transducers 36 on the headwheel 26. Corresponding suitable conductive segments 124 are arranged to maintain contact with the respective ones of the slip rings, as the shaft 28 is rotated. The contacts 124 may be coupled as shown by any suitable wiring to the electrical unit 40 on the base 58.

Figure 5:
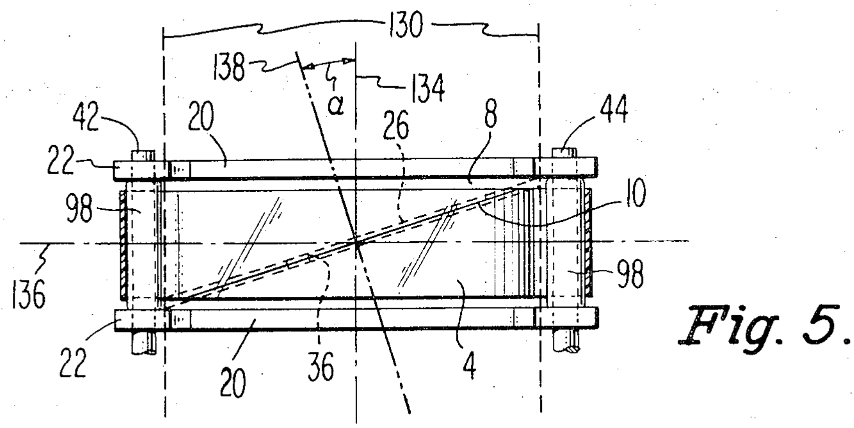
FIGS. 5 and 6 are front views of a portion of the arrangement shown in FIG. 1.
Figure 6:
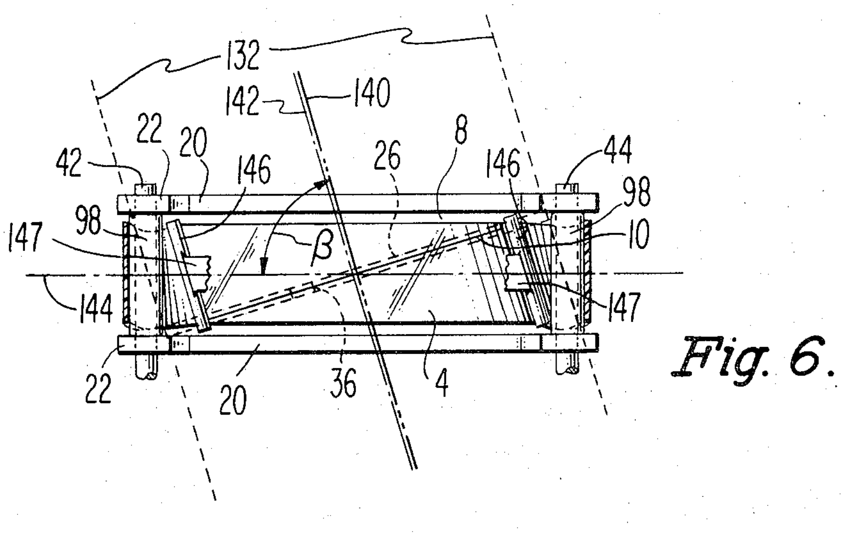

Further with regard to the arcuate web guide surface of the transport scanner assembly 2, there is illustrated in the front view of FIGS. 5 and 6, further details of two arrangements for the arcuate guide surface 8 of the transport scanner assembly 2. In FIGS. 5 and 6 like numbered elements correspond with those shown and described with respect to FIGS. 1 through 4. In both FIGS. 5 and 6 the guide surface 8 is the peripheral surface of a sector or segment of a cylinder, indicated by the dashed lines 130 and 132 in the respective FIGS. 5 and 6. In FIG. 5 the axis 134 of the cylinder 130 is substantially normal to the center line 136 of the moving web 4, and at an angle $\alpha$ with respect to the axis 138 of the headwheel 26. In FIG. 6 the axis 140 of the arcuate surface 8 of cylinder 132 is substantially parallel with the headwheel axis 142, and forms an angle $\beta$ with the center line axis 144 of the moving web 4.

Figures 7, 8:
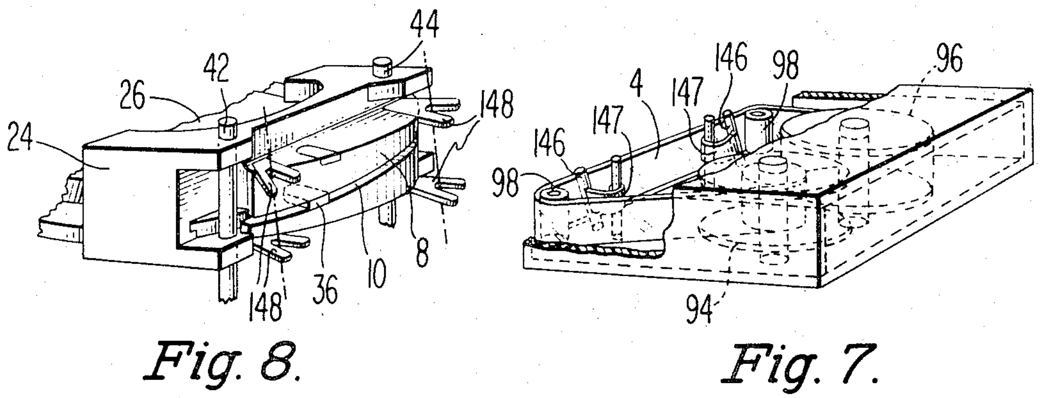
FIGS. 7 and 8 are perspective views illustrating details of a guiding arrangement for the recording web of FIG. 1.

In the arrangement of FIG. 6, because of the angle $\beta$ between the axis 140 of the cylinder and the center line axis 144 of the web 4, a pair of further guide members 146 are preferably provided to guide the moving web 4 between the guides 98 over the arcuate surface 8. In one arrangement, the guide members 146 comprise one or a number of non-rotatable pins or rods. As shown in FIG. 7, the guide members 146 are mounted within the cartridge assembly 6, on the side opposite the side of the web 4 which cooperates with the arcuate guide surface 8. The guide members 146 are floatably mounted to the cartridge 6, by means such as resilient leaf springs 147 secured to the ends thereof permitting angular movement of the guide members 146. Locating means, such as the bifurcated members 148, can be secured to the transport scanner assembly such as shown in FIG. 8. When the cartridge assembly 6 is disposed in cooperative relation with the transport-scanner assembly 2, the pairs of members 148 engage the guide means 146, to dispose them in desired orientation with respect to the arcuate guide surface 8.

Figure 9:
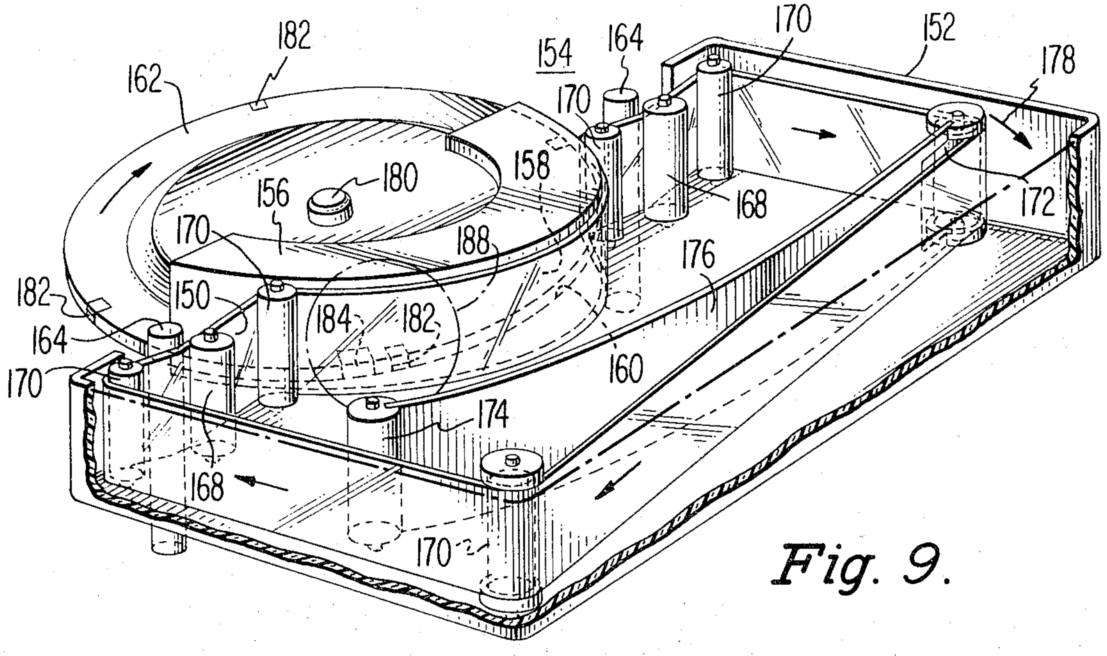
FIG. 9 is a perspective view showing the cooperative relation of scanned signal transducing and signal erasing means with an endless loop recording medium.

FIG. 9 shows a recorder-reproducer system of the type shown and described in FIGS. 1-8, and which is adapted to cooperate with a recording medium 150 that may be housed in a cartridge type enclosure 152. For simplicity and clarity in understanding the arrangement of FIG. 9, the recorder-reproducer system is shown in greatly simplified manner, since as indicated, the details of construction and operation thereof are shown and described with respect to FIGS. 1–8. The recorder-reproducer system of FIG. 9 has a scanner assembly 154. The scanner assembly 154 includes a guide member 156 which has an arcuate surface 158 over which the record medium 150 is supported. The surface 158 contains a slot 160 which, as previously describd, extends along and diagonally across the surface 158. Mounted for rotation in the slot is a disc member or headwheel 162.

The recording medium 150 is transported over the supporting surface 158 by means of a pair of capstan members 164. The pair of capstan members 164 cooperate with respective members 168. The members 168, for example, may comprise a pair of pinch rollers which are mounted in the cartridge member 152, by means not shown, for urging the recording medium 150 into cooperative relation with the pair of capstan means 164. The recording medium 150, as shown in FIG. 9, is disposed in a continuous endless loop form which extends about a series of guide-posts 170. The recording medium 150 also passes about a further guide member 172. The member 172 is moveably mounted with respect to a fixed member 174, by means of a spring like member 176 which biases or urges the member 172 in the direction of arrow 178. The member 172 through the action of the spring means 176, maintains the recording medium 150 in desired form and inhibits formation of slack of the recording medium 150 between the various guide elements.

The cartridge member 152, containing the endless loop recording medium 150, may be disposed in cooperative relation or spaced relation with respect to the scanner assembly 154, in the manner shown and described with respect to FIGS. 1–8.

The disc member 162 which is mounted for rotation on the shaft 180, has a plurality of signal transducing means 182 spaced about the periphery thereof. The signal transducing means are arranged to cooperate with the recording medium 150 through the slot 160 as the disc 162 is rotated, to provide a series of slant tracks extending diagonally across the recording medium 150. Also mounted on the periphery of the disc 162 is a signal erasing transducer means 184. The signal erasing means 184 is disposed in preceeding rotation relation with respect to a one of the signal transducing means 182. The center plane of the signal erasing means 184 is axially displaced from the central plane of the coplanar signal transducer means 182. The actual displacement of the signal erasing means 184 with respect to the signal transducing means 182 is such a distance that, the influence of the displacement of the recording medium 150 during the time between erasing and recording is removed. This displacement is due to the fact that the recording medium 150 passes at an angle with respect to the direction of movement of the transducers 182 and 184. The actual amount of axial displacement of the signal erasing means 184 with respect to the signal transducing means 182 is a matter of design, and depends upon the pitch of the recording medium on the guide surface, the speed of the recording medium, the velocity of the rotating disc and the angle of displacement on the disc between the signal transducing means and the erasing signal means.

Figure 10:
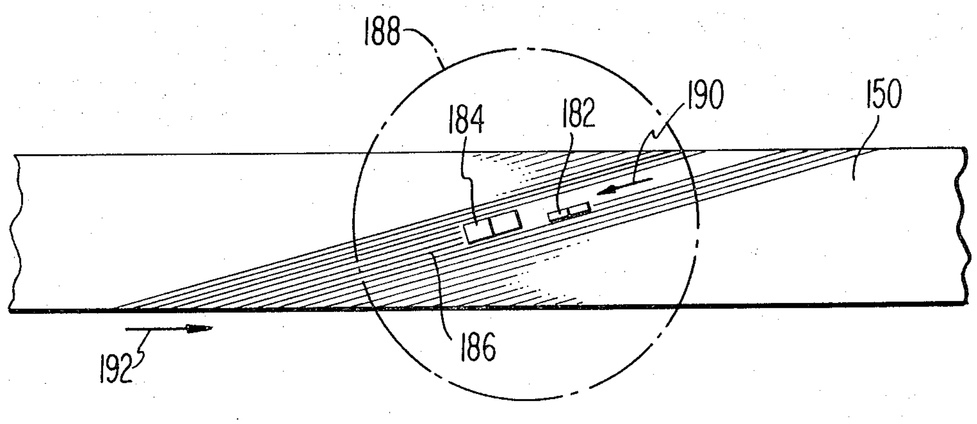
FIG. 10 is an illustrative view showing further details of the cooperation of the signal transducing and erasing means with the recording medium.

A clearer understanding of the cooperation among the signal transducer means 182, the signal erasing means 184 and the slant information tracks 186 on the recording medium 150, may be obtained from a consideration of FIG. 10 which shows in an expanded form, the encircled portion 188 of FIG. 9. As shown in FIG. 10, the signal erasing means 184 and signal transducing means 182 are moved in a direction indicated by the arrow 190, while the recording medium 150 is moved in a direction indicated by the arrow 192. In the embodiment as shown in FIG. 10, the erasing signal means 184 is dimensioned to be effective in erasing an area of the recording medium 150, which is sufficient to accommodate the number of information tracks 186 which is equal to the number of signal transducing means 182 on the disc 162. Thus, for example as previously described, where the disc 162 contains four signal transducing means, the signal erasing transducer means 184 is arranged to erase in preceeding relation an area sufficient to accommodate the next four signal information tracks 186, which are transduced by the four signal transducing means 182 during the next complete rotation of the disc 162. Alternatively, although not shown, individual signal erasing means arranged to erase a single information track, may be provided in proximate preceeding relation to each of the pluralities of signal transducing means on the rotatable headwheel or disc.

Figure 11:
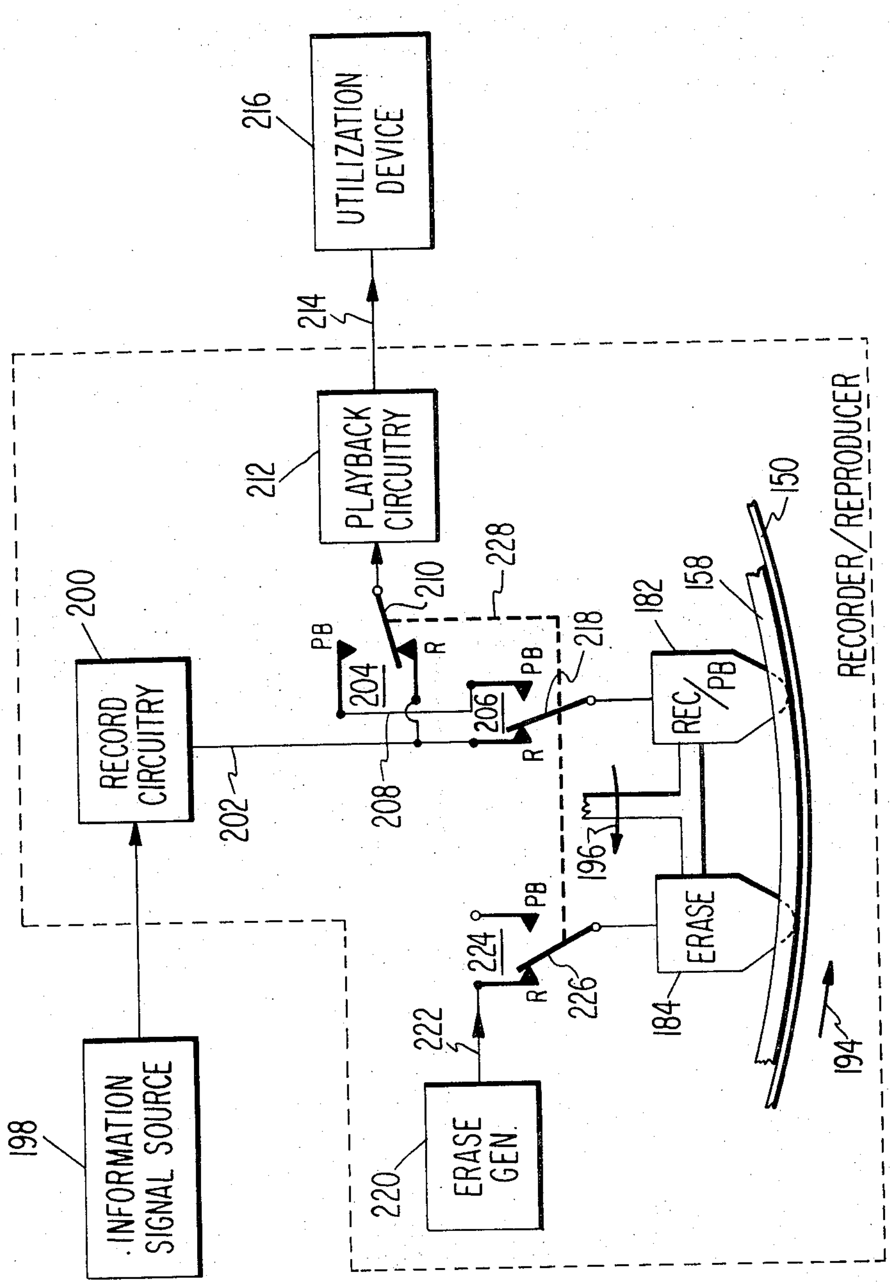
FIG. 11 is a partial diagrammatic partial schematic view showing the interface and cooperation of the signal circuitry with the scanned transducer devices.

FIG. 11 shows the interface and cooperation of the recorder reproducer circuitry with the signal transducing and erasing means, described with respect to FIGS. 9 and 10. In FIG. 11 the endless loop recording medium 150 is transported in the direction of arrow 194 over the supporting guiding surface 158, for scanning by the signal erasing means 184 and signal transducing means 182 which move in the direction of arrow 196. An information signal source 198 provides a given amount of information over a predetermined duration.

The information from the signal source 198 for example may comprise live video for a periof of 30 minutes, one hour, or even a longer duration. The information from source 198 is provided as an input to record circuitry 200 of the recorder-reproducer system. The output of record circuitry 200 on lead 202 is coupled to contacts denoted R (record) of a pair of switching means 204 and 206 respectively. Switching means 204 and 206 each include an additional contact means labeled PB (playback) which are intercoupled by lead 208. A wiper means 210 of switching means 204 is coupled as an input to the playback circuitry 212 of the recorder-reproducer system.

Details of the record and playback circuitry 200 and 212 need not be discussed herein, as such circuitry is well known in many forms in the prior art. The output of playback circuitry 212 on lead 214 is provided as an input to a utilization device 216, which for example may comprise a monitor for visually observing the information from the playback circuitry.

The wiper means 218 of switching means 206 is coupled to the signal transducing means 182. The transducing means 182 is of known type which is capable of both recording and playing back information with the recording medium 150. An erase signal generator 220 is coupled by means of lead 222 to a first contact labeled R (record) of a switching means 224. A further contact of switching means 224 noted PB (playback) is as shown disposed in open circuit manner. The wiper 226 of switching means 224 is coupled to the signal erasing transducer means 184. The erase generator 220 may be arranged to provide to the signal erasing means 184 a direct current, or an alternating current signal having a frequency greater than the frequency of the signals transduced by the means 182. In addition, the switching means 204, 206 and 224 are arranged for common actuation by suitable means such as represented by the dashed line member 228.

In operation of the apparatus described, the switcing means 204, 206 and 224 are initially disposed as shown with their respective wipers cooperating with the contacts noted R (record) of each of the switching means. For this condition, information from source 198 through record circuitry 200 is coupled to the signal transducing means 182 and is recorded on the recording medium 150. Simultaneously the information signal on lead 202 is also coupled through a playback circuitry 212 to the utilization device 216. During this period the erase signal means 184 is disposed to receive a signal from the generator 220, for erasing portions of the recording medium 150 which are in advance of the signal transducing means 182, as shown and described previously.

Thus as information is received from source 198, it is recorded on the medium 150 as well as being made available for utilization by the means 216. The medium 150, however, as indicated is of the continuous endless loop form. The length and therefore the available area for accommodating signal information tracks is chosen such that, only a portion of the duration of given amount of information of the source 198 may be accommodated on the recording medium 150 at any one time. Thus for example where the duration of given amount of information is 30 or 60 minutes, the length of the recording medium 150 is chosen to accommodate say 10 to 15 seconds of the information from the source 198. The recording medium 150 is advanced continuously and in a repetitive manner over the guide surface 158 for cooperation with the signal erasing means 184 and signal transducing means 182. As one cycle of recording on the medium 150 is completed, which corresponds with for example as indicated 10 or 15 seconds, the erased signal means 184 is effective to remove the previously recorded information, while the following signal transducing means 182 provide recorded tracks containing information received from the information source 198 within the last 10 to 15 seconds.

During this mode of operation, it may be decided one or a number of times that, it is desirable to repeat a segment of particular information just monitored by the utilization means 216. If such is desired, the switching means 204, 206 and 224 are disposed with their respective wipers cooperating with the contacts denoted PB (playback) of each of the switching means. In this condition, the erasing signal means 184 is de-energized, by removing the signal from erased generator 220 from the signal erasing means 184. The output from record circuitry 202 is de-coupled from the signal transducing means 182. The signal transducing means 182 now is disposed for playback of information from the recording medium 150, through the playback circuitry 212 to the utilization device 216. This just described condition may then be maintained for a desired period, during which the prior segment of information from the source 198 will be repetitively played back a desired number of times.

It is to be noted with the advantageous arrangement described that recorded information is periodically updated. Also when it is desired to recover an information segment of interest, this may be done immediately without searching of the recording medium and may be repeated any number of desired times in simplified and rapid manner.

What is claimed is:

1. In a slant recorder-reproducer system for processing an amount of information having a given duration said system being of the type having means for supporting at least a portion of an elongated record medium, said supporting means including a slot therein through which rotatable disc means traverses a given path at an angle with respect to the longitudinal direction of movement of and in cooperative relation with said record medium, the combination comprising: a plurality of signal transducing means each adapted to record and play back said signal from said record medium, means coupled to said signal transducing means and operative to couple said information to said signal transducing means, means mounting said signal transducing means in spaced relation about the periphery of said disc for cooperation of each said transducing means with said medium along said given path to continuously transduce information with a plurality of spaced tracks of given width obliquely of said medium as said disc is rotated, signal erasing means, means mounting said signal erasing means on said disc in preceding rotation relation to one of said signal transducing means, said signal erasing means being dimensioned to erase during a single traversal of said medium by said erasing means a portion of said medium in advance of said signal transducing means, said erased portion having dimensions to accommodate a number of said tracks equal to the number of said plurality of signal transducing means, a given length of said elongated record medium arranged in an endless loop form, said given length of said medium being such as to permit transducing therewith a continuous portion of said amount of information, said portion being substantially less than the given duration of said amount of information, and means for continuously advancing said record medium in cooperative relation with said supporting means.

2. The combination with an apparatus responsive to a given amount of information for transducing said information with a record web arranged in endless loop form which is disposed between first and second opposite walls of a web cartridge, said record web being dimensioned to store thereon a portion of said information which portion is small relative to said given amount of said information, comprising: a support member, arcuate web guide surface member dimensioned to pass between said first and second walls into said cartridge, said arcuate guide surface member having a slot therein extending along and diagonally across said arcuate surface, transducer means mounted for rotation through said slot for successive coaction with said endless loop record web to scan transverse tracks across said web, said transducer means including a plurality of spaced signal transducing means each capable of imparting signals to and recovering signals from said record web and signal erasing means, means mounting said signal erasing means in preceding rotational relation to said signal transducing means, means for mounting said arcuate guide surface member to said support member and for receiving said cartridge to dispose said cartridge with said arcuate surface interposed between said first and second wall and extending into said cartridge in cooperative relation with said endless record web, and means for continuously advancing said endless loop recording web to repetitively dispose each portion of said web over said web guide surface member in cooperative relation with said transducer means.

3. The invention according to claim 2, including: recording circuit means responsive to said information in the form of a signal input applied thereto to provide a first output, playback circuit means providing a further output in response to a signal applied to an input thereof, further means operative in a first mode for simultaneously coupling said first output to said signal transducing means and to said input to said playback circuit means wherein said further output is determined in accordance with said information signal input, said further means being operative in a second mode thereof for coupling said signal transducing means to the input of said playback circuit means, wherein said further output is determined in accordance with a signal from said recording web, a source of erasing signal, and means for applying said erasing signal from said source to energize said signal erasing means when said further means is disposed in said first mode thereof.

4. In a system for transducing an information signal with an elongated record medium arranged in endless loop form, the combination comprising: signal transducing means, means mounting said signal transducing means for movement along a given path over said medium, signal erasing means, means mounting said signal erasing means for movement along said given path in preceding relation to said signal transducing means, means for supporting when present a portion of said endless loop record medium for scanning along said path thereover by said signal transducing means and said signal erasing means, recording circuit means responsive to said information signal input applied thereto to provide a first output, playback circuit means providing a further output in response to a signal applied to an input thereof, further means operative in a first mode for simultaneously coupling said first output to said signal transducing means and to said input to said playback circuit means wherein said further output is determined in accordance with said information signal input, said further means being operative in a second mode thereof for coupling said signal transducing means to the input of said playback circuit means, wherein said further output is determined in accordance with a signal from said record medium, means for energizing said signal erasing means when said further means is disposed in said first mode thereof, and means for continuously advancing when present said endless loop record medium to repetitively dispose each successive portion of said medium over said supporting means in cooperative relation with said signal transducing means and said erasing means.

* * * * *